US012113938B2

(12) United States Patent
Ikeda

(10) Patent No.: US 12,113,938 B2
(45) Date of Patent: Oct. 8, 2024

(54) IMAGE PROCESSING SYSTEM, IMAGE PROCESSING APPARATUS, CONTROL METHOD

(71) Applicant: CANON KABUSHIKI KAISHA, Tokyo (JP)

(72) Inventor: Satoru Ikeda, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/540,760

(22) Filed: Dec. 2, 2021

(65) Prior Publication Data
US 2022/0182497 A1 Jun. 9, 2022

(30) Foreign Application Priority Data

Dec. 7, 2020 (JP) ................................. 2020-202982

(51) Int. Cl.
H04N 1/00 (2006.01)
G06V 10/82 (2022.01)
G06V 30/413 (2022.01)
H04N 1/387 (2006.01)

(52) U.S. Cl.
CPC ....... H04N 1/00005 (2013.01); G06V 30/413 (2022.01); H04N 1/00037 (2013.01); H04N 1/00456 (2013.01); H04N 1/00461 (2013.01); H04N 1/3877 (2013.01); G06V 10/82 (2022.01)

(58) Field of Classification Search
None
See application file for complete search history.

(56) References Cited

U.S. PATENT DOCUMENTS

| 6,301,381 | B1 * | 10/2001 | Hayashi | G06V 30/413 |
| | | | | 382/176 |
| 7,215,828 | B2 * | 5/2007 | Luo | G06V 10/242 |
| | | | | 382/296 |
| 10,616,443 | B1 * | 4/2020 | Lund | G06V 30/414 |
| 2003/0099395 | A1 * | 5/2003 | Wang | G06V 10/242 |
| | | | | 382/165 |

(Continued)

FOREIGN PATENT DOCUMENTS

| CN | 110807309 | * | 2/2020 | ............. G06N 3/045 |
| JP | 2001333372 | * | 11/2001 | ............... G06F 3/00 |

(Continued)

OTHER PUBLICATIONS

A. P. V and K. K, "Multilingual Text Inversion Detection using Shape Context," 2021 IEEE Region 10 Symposium (TENSYMP), 2021, pp. 1-6, doi: 10.1109/TENSYMP52854.2021.9550858. (Year: 2021).*

(Continued)

Primary Examiner — Beniyam Menberu
(74) Attorney, Agent, or Firm — Canon U.S.A., Inc. IP Division

(57) ABSTRACT

An image processing apparatus includes a display device configured to display information, a reading device configured to read a document, and one or more controllers configured to function as a unit configured to input an image read by the reading device to a trained model trained based on an image that does not contain text and orientation information about the image that does not contain text, and a unit configured to display information about the image read by the reading device on the display device based on at least an output result from the trained model.

17 Claims, 15 Drawing Sheets

(56) References Cited

U.S. PATENT DOCUMENTS

| | | | | |
|---|---|---|---|---|
| 2004/0184115 A1* | 9/2004 | Suzuki | ............... | H04N 1/00461 358/474 |
| 2006/0251292 A1* | 11/2006 | Gokturk | ................. | G06F 16/58 707/E17.022 |
| 2011/0206275 A1* | 8/2011 | Takahashi | ................. | G06T 7/74 382/159 |
| 2016/0275374 A1* | 9/2016 | Zhu | ........................ | G06V 10/50 |
| 2019/0295289 A1* | 9/2019 | Khan | ...................... | G06V 10/24 |
| 2019/0311227 A1* | 10/2019 | Kriegman | ........ | G06V 30/19173 |
| 2020/0311409 A1* | 10/2020 | Luo | ......................... | G06F 18/22 |
| 2020/0311844 A1* | 10/2020 | Luo | ...................... | G06Q 50/265 |
| 2020/0314346 A1* | 10/2020 | Mukul | ................. | G06V 30/414 |
| 2020/0410291 A1* | 12/2020 | Kriegman | ............. | G06V 20/63 |
| 2021/0056353 A1* | 2/2021 | Vahdat | ................ | G06V 10/761 |
| 2021/0390326 A1* | 12/2021 | Hattori | ..................... | G06T 7/74 |
| 2022/0311892 A1* | 9/2022 | Itoh | ..................... | G06V 30/413 |

FOREIGN PATENT DOCUMENTS

| | | | | | |
|---|---|---|---|---|---|
| JP | 2002190940 A | | 7/2002 | | |
| JP | 2004056482 | * | 2/2004 | ................ | B41J 5/30 |
| JP | 2004110368 | * | 4/2004 | ................ | H04N 1/04 |
| JP | 2006039666 A | | 2/2006 | | |
| JP | 2007200280 | * | 8/2007 | ........... | H04N 1/0044 |
| JP | 2010219895 A | | 9/2010 | | |
| JP | 4931897 | * | 5/2012 | ............... | H04N 1/04 |
| JP | 2013251744 | * | 12/2013 | ............... | H04N 1/00 |
| JP | 2017098848 | * | 6/2017 | ............... | G06K 9/20 |
| WO | WO 2020040012 | * | 2/2020 | ............... | G06T 7/00 |

OTHER PUBLICATIONS

L. Morra, S. Famouri, H. C. Karakus and F. Lamberti, "Automatic detection of canonical image orientation by convolutional neural networks," 2019 IEEE 23rd International Symposium on Consumer Technologies (ISCT), Ancona, Italy, 2019, pp. 118-123, doi: 10.1109/ISCE.2019.8901005. (Year: 2019).*

K. Swami, P. Deshpande, G. Khandelwal, A. Vijayvargiya, "Why my photos look sideways or upside down? Detecting Canonical Orientation of Images using Convolutional Neural Networks", 2017 IEEE International Conference on Multimedia & Expo Workshops; arXiv:1712.01195v1, 2017, pp. 1-7 (Year: 2017).*

* cited by examiner

FIG.5
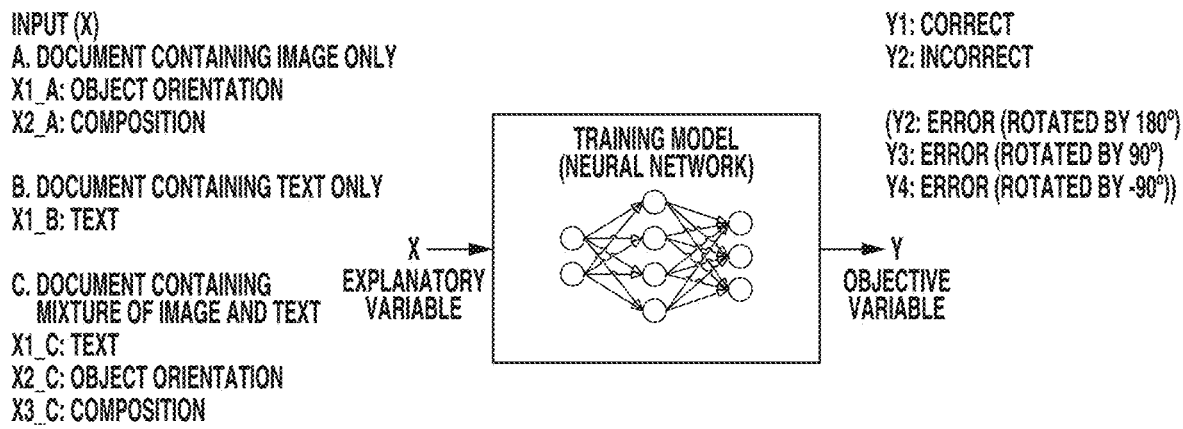
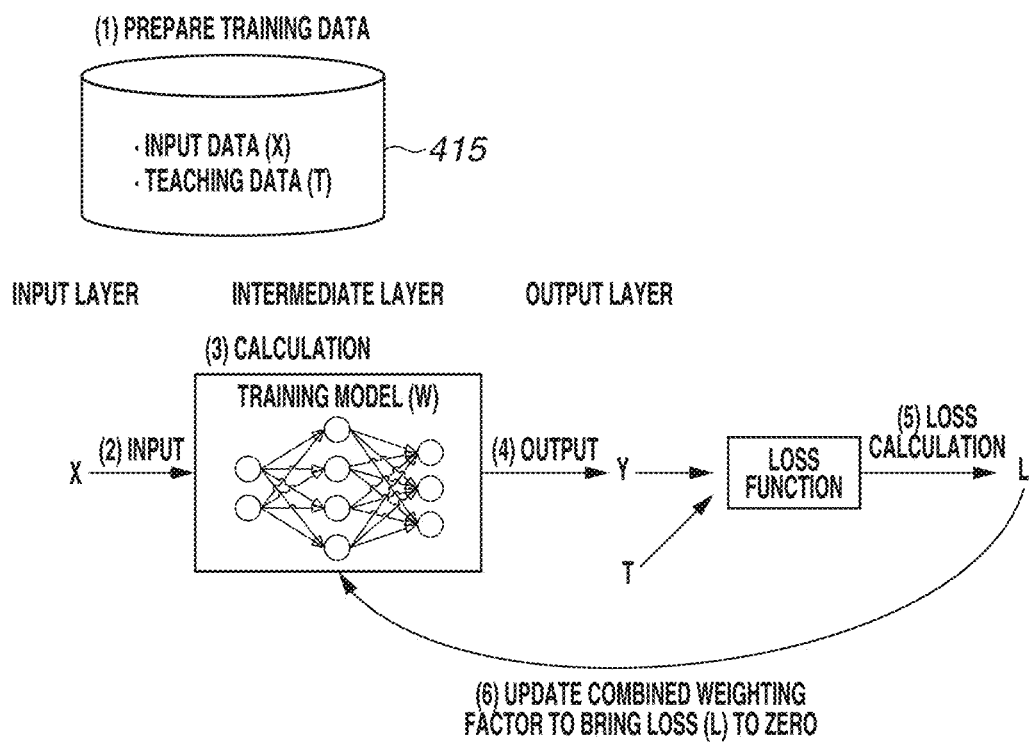

FIG.7
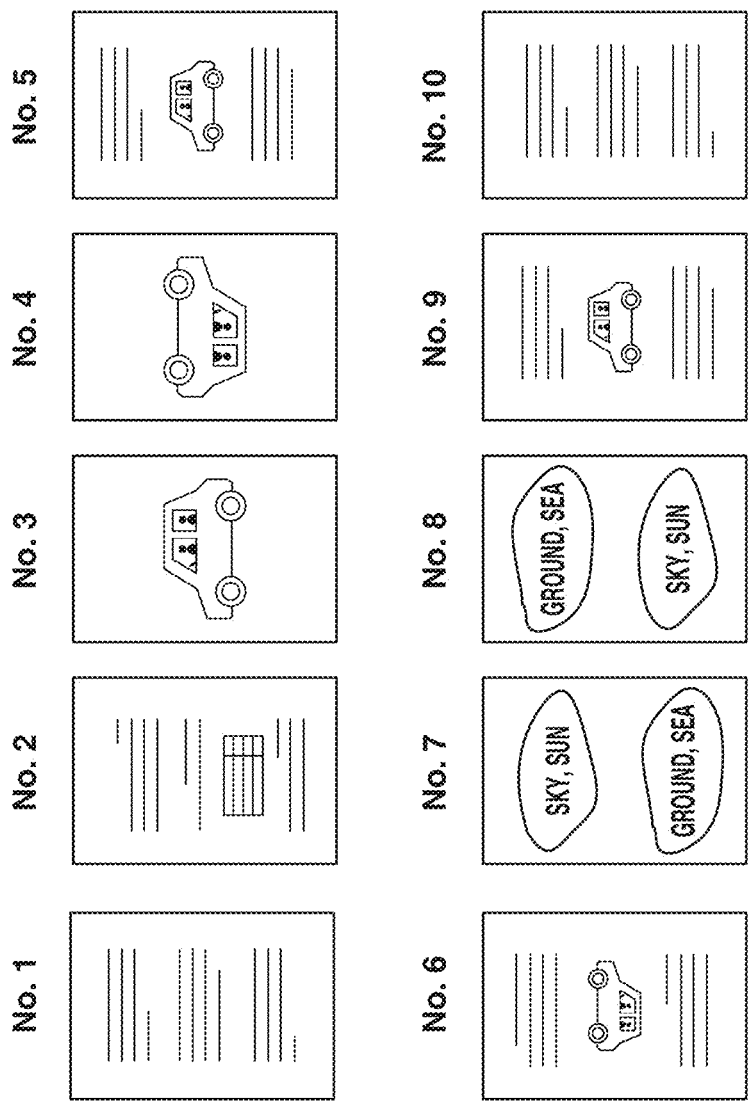
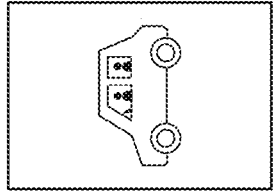
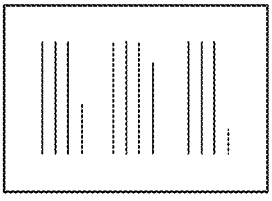
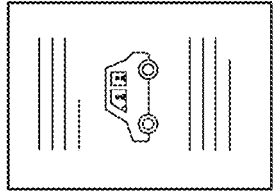

FIG.8

A. TEACHING DATA

| | | INPUT ORDER [n] | | | | | | | | | |
|---|---|---|---|---|---|---|---|---|---|---|---|
| CORRECT TOP/BOTTOM | TEACHING DATA: T1 | TRUE(1) | FALSE(0) | TRUE(1) | FALSE(0) | TRUE(1) | FALSE(0) | TRUE(1) | FALSE(0) | TRUE(1) | TRUE(1) |
| INCORRECT TOP/BOTTOM | TEACHING DATA: T2 | FALSE(0) | TRUE(1) | FALSE(0) | TRUE(1) | FALSE(0) | TRUE(1) | FALSE(0) | TRUE(1) | FALSE(0) | FALSE(0) |
| INPUT [X] | INPUT DATA: A | PAGE 1 | PAGE 2 | PAGE 3 | PAGE 4 | PAGE 5 | PAGE 6 | PAGE 7 | PAGE 8 | PAGE 9 | PAGE 10 |

TRAINING ITEMS (X)

| | | | | | | | | | | | | |
|---|---|---|---|---|---|---|---|---|---|---|---|---|
| A | OBJECT ORIENTATION | EXPLANATORY VARIABLE: X1 | NONE | NONE | CORRECT | INVERTED | CORRECT | INVERTED | NONE | NONE | CORRECT | NONE |
| | COMPOSITION | EXPLANATORY VARIABLE: X2 | NONE | NONE | NONE | NONE | NONE | NONE | CORRECT | INVERTED | NONE | NONE |
| | TEXT | EXPLANATORY VARIABLE: X3 | CORRECT | INVERTED | NONE | NONE | CORRECT | INVERTED | NONE | NONE | CORRECT | CORRECT |

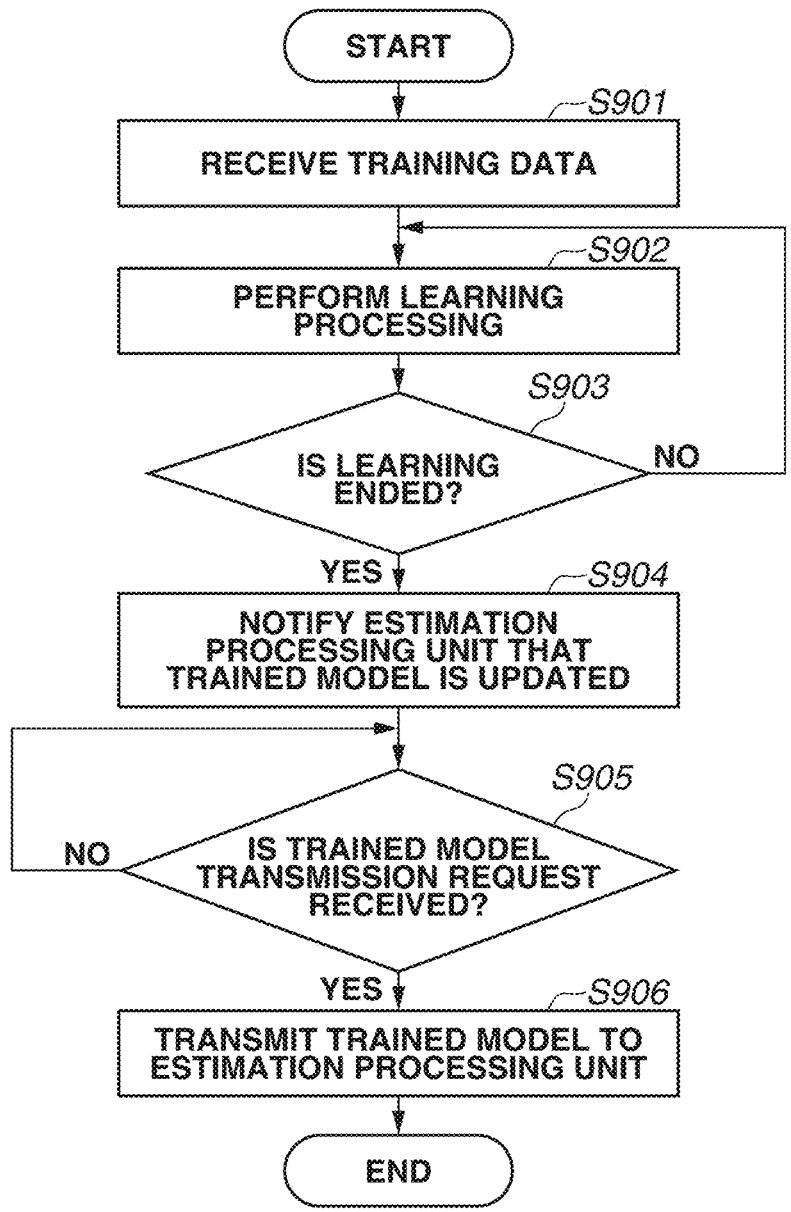

FIG.10A

SEARCHING FOR DOCUMENTS THAT MAY BE ORIENTED INCORRECTLY.

[ CORRECT ALL ] [ CHECK CORRECTION ] [ DO NOT CORRECT ]

FIG.10B

THIS DOCUMENT MAY BE ORIENTED INCORRECTLY.
DO YOU WANT TO APPLY CORRECTION?

SCANNED DATA → SUGGESTED CORRECTION

< 2/4 >  [ APPLY SUGGESTED CORRECTION ] [ CORRECT MANUALLY ] [ DO NOT CORRECT ]

IMAGE PROCESSING SYSTEM, IMAGE PROCESSING APPARATUS, CONTROL METHOD

BACKGROUND OF THE DISCLOSURE

Field of the Disclosure

The present disclosure relates to an image processing apparatus that estimates the top and bottom of a read image. The image processing apparatus is used as a copy machine, a scanner, and a multi-function peripheral thereof.

Description of the Related Art

There have been known conventional image processing apparatuses such as scanners that read image information from documents. The image processing apparatuses can read an image of a document with the top and bottom of the document on wrong sides due to a user operation error. Japanese Patent Application Laid-Open No. 2010-219895 discusses a technique for detecting the top and bottom of an image using an optical character recognition (OCR) technique and correcting the orientation of the image based on the detection result.

The technique discussed in Japanese Patent Application Laid-Open No. 2010-219895 can correct the top and bottom of a document using OCR with the document containing text. However, the technique cannot identify the top and bottom of a document that contains an image with no text therein.

SUMMARY OF THE DISCLOSURE

The present disclosure is directed to providing an image processing apparatus that identifies the top and bottom of a document that does not contain text.

According to an aspect of the present disclosure, an image processing apparatus includes a display device configured to display information, a reading device configured to read a document, and one or more controllers configured to function as a unit configured to input an image read by the reading device to a trained model trained based on an image that does not contain text and orientation information about the image that does not contain text, and a unit configured to display information about the image read by the reading device on the display device based on at least an output result from the trained model.

Further features of the present disclosure will become apparent from the following description of exemplary embodiments with reference to the attached drawings.

BRIEF DESCRIPTION OF THE DRAWINGS

FIG. 5 is a diagram illustrating a training model.
FIG. 7 illustrates training data.
FIG. 8 illustrates teaching data.
FIG. 9 is a flowchart illustrating a learning-related process.
FIG. 10A illustrates a read image list screen.
FIG. 10B illustrates a screen presenting a suggested correction for a read image.

DESCRIPTION OF THE EMBODIMENTS

Some exemplary embodiments of the present disclosure will be described below with reference to the drawings. The scope of the present disclosure is not limited to the configurations described in the exemplary embodiments. Modifications such as replacement of a part of the configurations with an equivalent thereof and omission of part of processing can be made within a range that produces an equivalent advantage.

<System Configuration>

Figure 1:
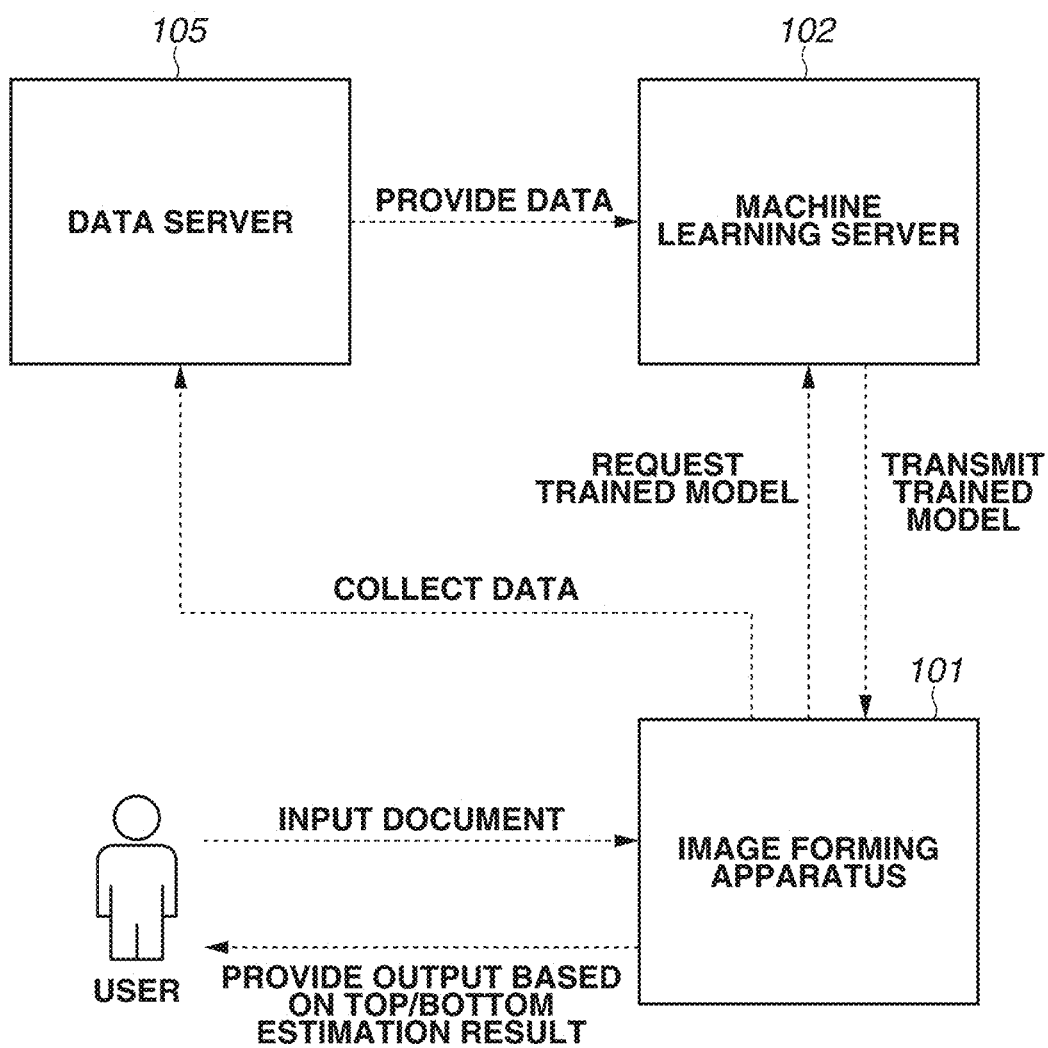
FIG. 1 illustrates a system configuration.

A first exemplary embodiment will be described. FIG. 1 illustrates an image processing system. An image processing system 100 includes an image forming apparatus 101 and a machine learning server 102.

The image forming apparatus 101 has an artificial intelligence (AI) function of estimating the top and bottom of a read image and outputs a result based on the top/bottom estimation on document input from a user. A trained model for carrying out the AI function is received from the machine learning server 102.

The machine learning server 102 trains a training model for carrying out the AI function.

Data for training is transmitted from a data server 105 as appropriate.

The data server 105 collects and generates data to be provided to the machine learning server 102. For example, the data server 105 also receives data provided from the image forming apparatus 101 as appropriate.

Figure 6:
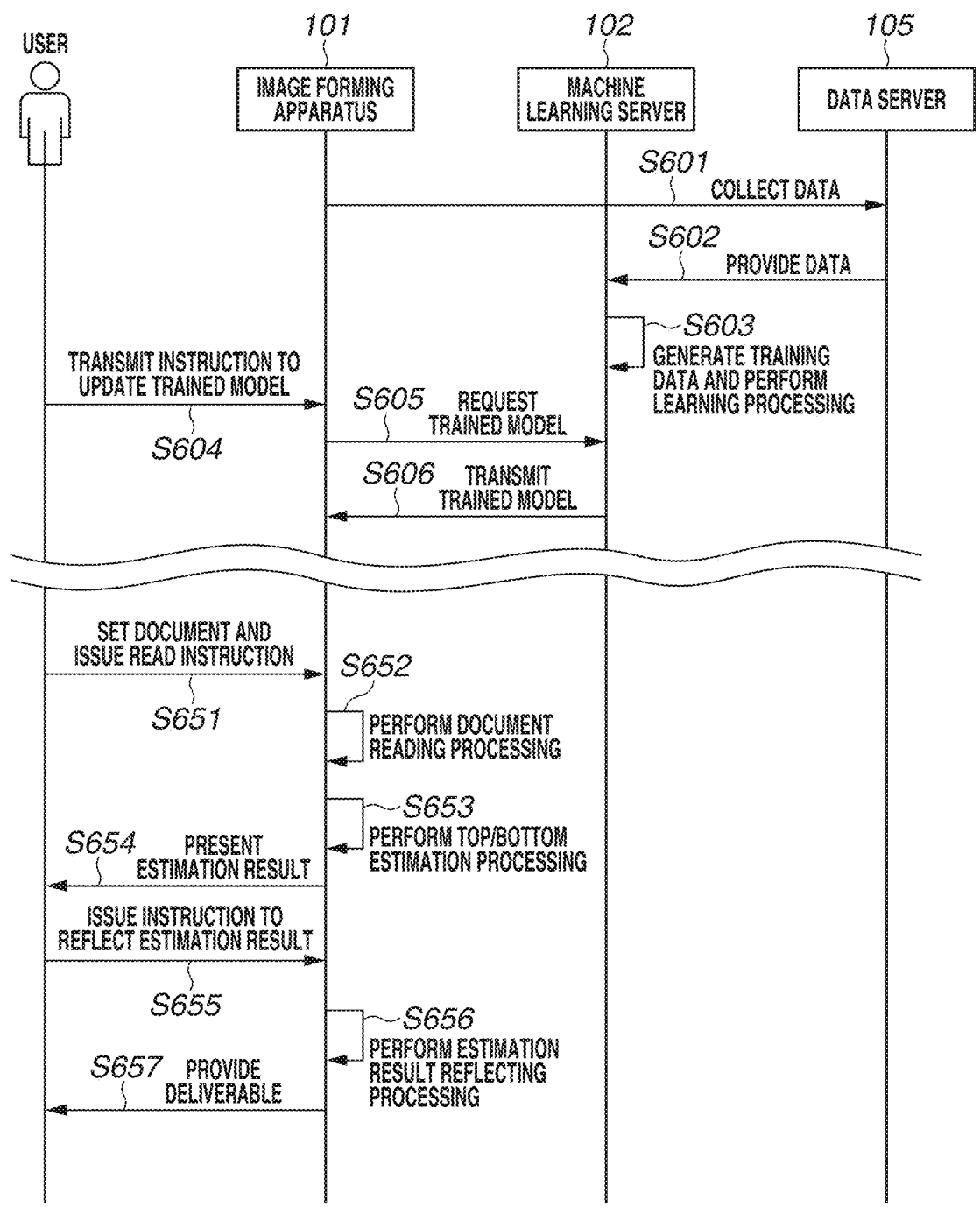
FIG. 6 is a diagram illustrating a use sequence.

FIG. 6 is a diagram illustrating a use sequence of the image processing system 100.

In step S601, the data server 105 collects data for use in learning from an apparatus on a network including the image forming apparatus 101. Data for use in learning is a correction result by the user in a top/bottom estimation process described below and an image thereof. Further, a result of converting page description language (PDL) data transmitted from a general-purpose computer 103 into an image by the image forming apparatus 101 can be employed as data for use in learning.

In this case, all the images based on PDL data are treated as a top/bottom-corrected image.

In step S602, the data server 105 transmits the collected data that is suitable for use in learning to the machine learning server 102.

In step S603, the machine learning server 102 generates training data based on the data received from the data server 105 and trains the training model using the generated training data. In some embodiments, training data is generated in advance by the data server 105.

In step S604, an instruction to update the trained model for use in top/bottom estimation is transmitted to the image forming apparatus 101.

In step S605, the image forming apparatus 101 transmits a request for the latest trained model to the machine learning server 102.

In step S606, the machine learning server 102 transmits the trained model to the image forming apparatus 101.

In step S651, the user sets a document on a document reading device of the image forming apparatus 101 and issues a read instruction.

In step S652, the image forming apparatus 101 performs processing to read image information on the set document.

In step S653, the image forming apparatus 101 performs top/bottom estimation processing on the acquired image.

In step S654, the image forming apparatus 101 presents the estimation result to the user.

In step S655, the user issues an instruction to correct the image based on the top/bottom estimation result.

In step S656, the image forming apparatus 101 corrects the image and thereafter runs a job. Examples of the job herein include a copying job, a storing job, and a transmitting job. In a copying job, the image is printed using a printer 20. In a storing job, the image is stored in a hard disk drive (HDD) 204, an internal storage of the image forming apparatus 101, or an external storage such as a universal serial bus (USB) memory. In a transmitting job, the image is transmitted to an external destination such as a facsimile (FAX) destination, an email destination, a shared folder, or a cloud service.

In step S657, the image forming apparatus 101 provides a product to the user. For example, the copying job provides a printed sheet, whereas the storing job or the transmitting job presents a processing result to the user.

<Image Forming Apparatus>

Figure 2:
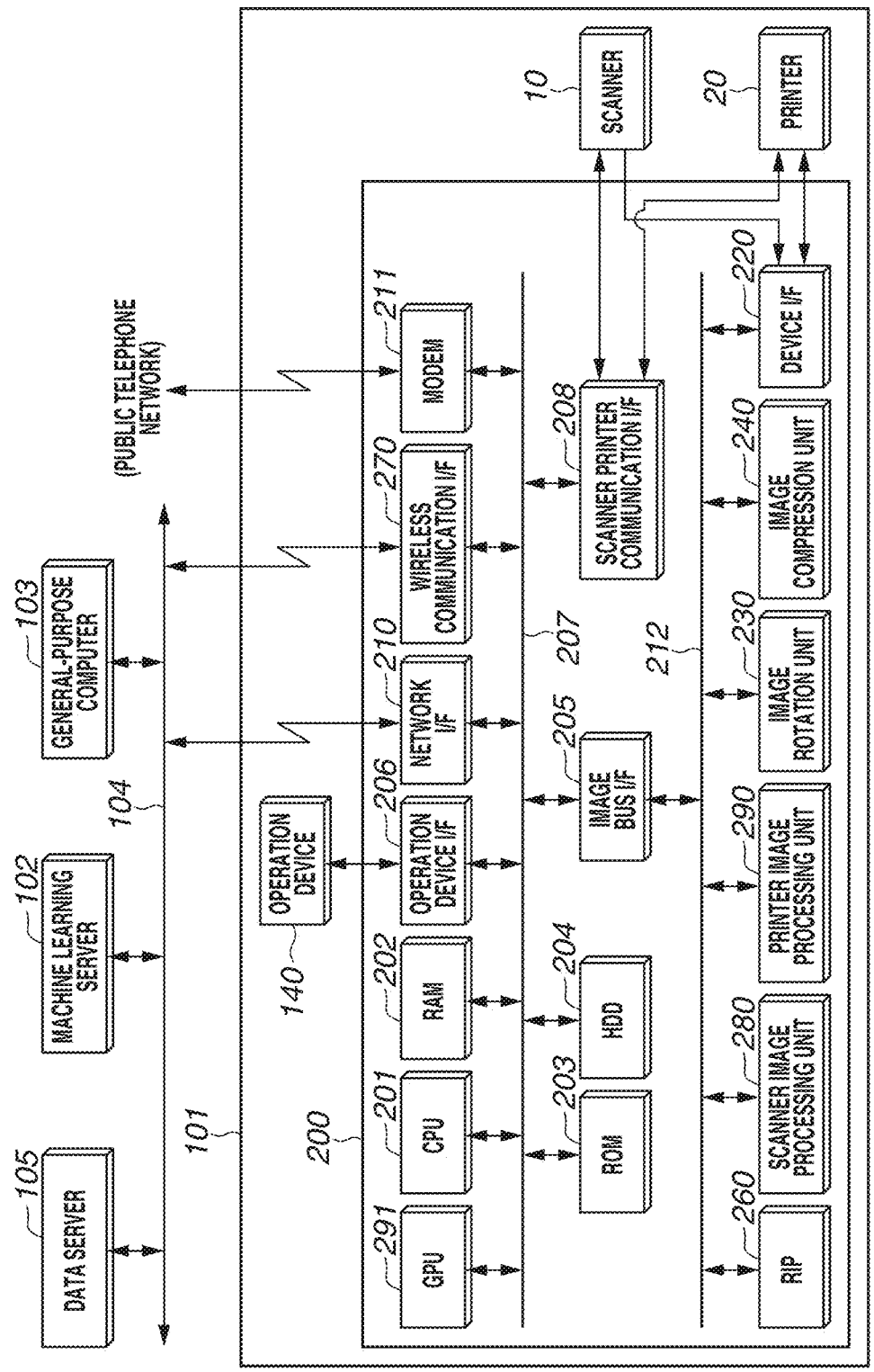
FIG. 2 illustrates the hardware configuration of an image forming apparatus.

FIG. 2 illustrates a hardware configuration of the image forming apparatus 101.

The image forming apparatus 101 is a multi-function peripheral (image processing apparatus) that has an image forming function of forming images on sheets and a reading function of reading documents. The image forming apparatus 101 are communicably connected to the machine learning server 102 and the data server 105 of the image processing system 100 via a network 104. Further, the image forming apparatus 101 receives print data from the general-purpose computer 103 via the network 104 and performs image forming processing based on the received print data. The image forming apparatus 101 according to the present exemplary embodiment is an electrophotographic apparatus. Alternatively, the image forming apparatus 101 can be an apparatus that employs another image forming method such as an inkjet apparatus.

The image forming apparatus 101 includes an operation device 140, a scanner 10, the printer 20, and a controller 200.

The operation device 140 is used for the user to perform various operations. The operation device 140 includes a display, a touch panel, and hardware keys. The display is a display device to display information. The touch panel and the hardware keys are input devices to receive information input from the user.

The scanner 10 is a reading device to read image information on documents. The scanner 10 includes a central processing unit (CPU) (not illustrated), an illumination lamp (not illustrated), and a scan mirror (not illustrated). The CPU controls components of the scanner 10, and the illumination lamp and the scan mirror are used in document reading.

The printer 20 is an image forming device to form images on sheets. The printer 20 includes a CPU (not illustrated), a photosensitive drum (not illustrated), and a fixing device (not illustrated). The CPU controls components of the printer 20, and the photosensitive drum and the fixing device are used in image forming and fixing, respectively.

The controller 200 is a control unit to generally control operations of the image forming apparatus 101. The controller 200 includes a configuration connected to a system bus 207 and a configuration connected to an image bus 212, and the system bus 207 and the image bus 212 are communicably connected to each other via an image bus interface (image bus I/F) 205, which functions as a bus bridge.

The controller 200 includes a graphics processing unit (GPU) 291, a CPU 201, a random access memory (RAM) 202, a read-only memory (ROM) 203, the HDD 204, an operation device interface (operation device i/F) 206, a scanner printer communication interface (scanner printer communication i/F) 208, a network interface (network IF) 210, a wireless communication interface (wireless communication I/F) 270, and a modem 211 as components of the configuration connected to the system bus 207.

The CPU 201 is a processor to perform various kinds of computation processing. The RAM 202 serves as a system work memory used in operation of the CPU 201 and also as an image memory for temporarily storing image data. The ROM 203 is a memory to store a boot program to be run by the CPU 201. The HDD 204 is a data storage to store system software, image data, and software counter values. The controller 200 records and manages a job run history including usernames and output attribute information such as the number of prints and color printing in print/copy job run as job log information in the HDD 204 or the RAM 202.

The operation device I/F 206 has a role of transmitting information input via the operation device 140 by the user that uses the image forming apparatus 101, to the CPU 201. The network I/F 210 is connected to the network 104 and performs communication (transmission and reception) with the general-purpose computer 103 and other computer terminals (not illustrated) on the network 104. The modem 211 is connected to a public line and communicates (transmits and receives) data with an external facsimile apparatus (not illustrated). The wireless communication/F 270 is wirelessly connected to the network 104. The internal communication i/F 208 communicates with the scanner 10 and the printer 20.

The GPU 291 is a processor capable of processing more data in parallel. The GPU 291 is used effectively in performing learning a plurality of times such as deep learning. According to the present exemplary embodiment, the GPU 291 is used in addition to the CPU 201 in processing using the training model. Specifically, in running learning programs including the training model, the CPU 201 and the GPU 291 compute in cooperation with each other to perform learning. In the processing by a machine learning unit 414, the CPU 201 or the GPU 291 may compute alone. Further, as in processing by the machine learning unit 414, the GPU 291 may be used in the processing by an estimation processing unit 405.

The controller 200 includes a raster image processor (RIP) 260, a scanner image processing unit 280, a printer image processing unit 290, an image rotation unit 230, an image compression unit 240, and a device interface (device I/F) 220 as components of the configuration connected to the image bus 212.

The RIP 260 is a processor to rasterize PDL codes into bitmap images. The scanner image processing unit 280 corrects, processes, and edits image data input from the scanner 10. The image rotation unit 230 rotates image data.

The printer image processing unit 290 performs correction and resolution conversion on image data to be output (printed) from the printer 20.

The image compression unit 240 performs Joint Photographic Experts Group (JPEG) compression/decompression processing on multi-valued image data and performs Joint Bi-level Image Experts Group (JBIG), Modified Modified Read (MMR), or Modified Huffman (MH) compression/decompression processing on binary image data. The device I/F 220 communicates with the scanner 10 and the printer 20.

<Machine Learning Server>

Figure 3A:
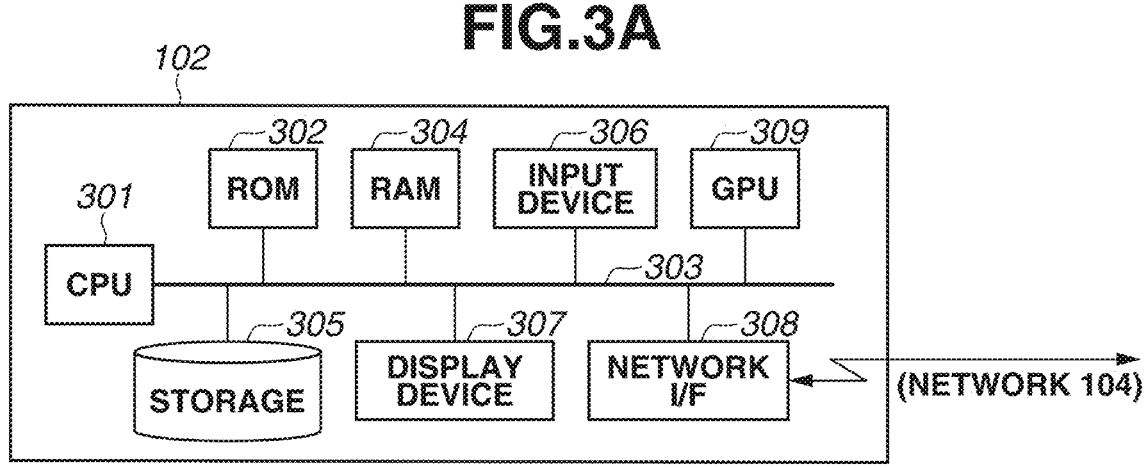
FIG. 3A illustrates the hardware configuration of a learning server.

FIG. 3A illustrates a configuration of the machine learning server 102.

The machine learning server 102 is a server to train and distribute the training model.

The machine learning server 102 includes a CPU 301, a ROM 302, a RAM 304, a storage 305, an input device 306, a display device 307, a network interface (network I/F) 308, and a GPU 309. The foregoing components can transmit and receive data to and from one another via a system bus 303.

The CPU 301 is a processor to compute to control the entire machine learning server 102. The CPU 301 reads programs such as an operating system (OS) or application software from the storage 305 and runs the read OS or application software to offer various functions. The RAM 304 serves as a system work memory in run of program by the CPU 301. The ROM 302 stores programs to launch a basic input output system (BIOS) and an OS and stores setting files. The storage 305 is a storage device such as a HDD to store information and system software.

The input device 306 is an input device such as a mouse and a keyboard. The display device 307, such as a display, displays information.

The GPU 309 is an image processing processor. The GPU 309 is used effectively in performing learning a plurality of times such as deep learning. Thus, according to the first exemplary embodiment, the GPU 309 is used in addition to the CPU 301 in processing by the machine learning unit 414. Specifically, in running learning programs including the training model, the CPU 301 and the GPU 309 compute in cooperation with each other to perform learning. In the processing by the machine learning unit 414, the CPU 301 or the GPU 309 may compute alone. Further, the estimation processing unit 405 may use the GPU 309 as with the machine learning unit 414. Further, calculation processing such as learning may be performed by the machine learning server 102 alone or in cooperation with another apparatus.

<Data Server, General-Purpose Computer>

Figure 3B:
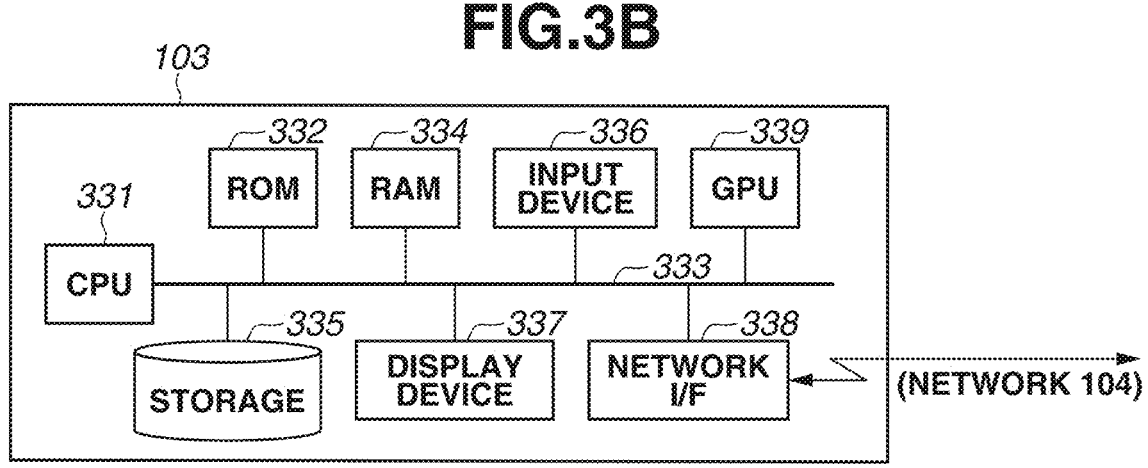
FIG. 3B illustrates the hardware configuration of a general-purpose computer.

FIG. 3B illustrates a configuration of the general-purpose computer 103.

The general-purpose computer 103 includes a CPU 331, a ROM 332, a RAM 334, a storage 335, an input device 336, a display device 337, a network i/F 338, and a GPU 339. The foregoing components can transmit and receive data to and from one another via a system bus 333. The components are similar to those of the machine learning server 102, and redundant descriptions thereof will be omitted.

Figure 3C:
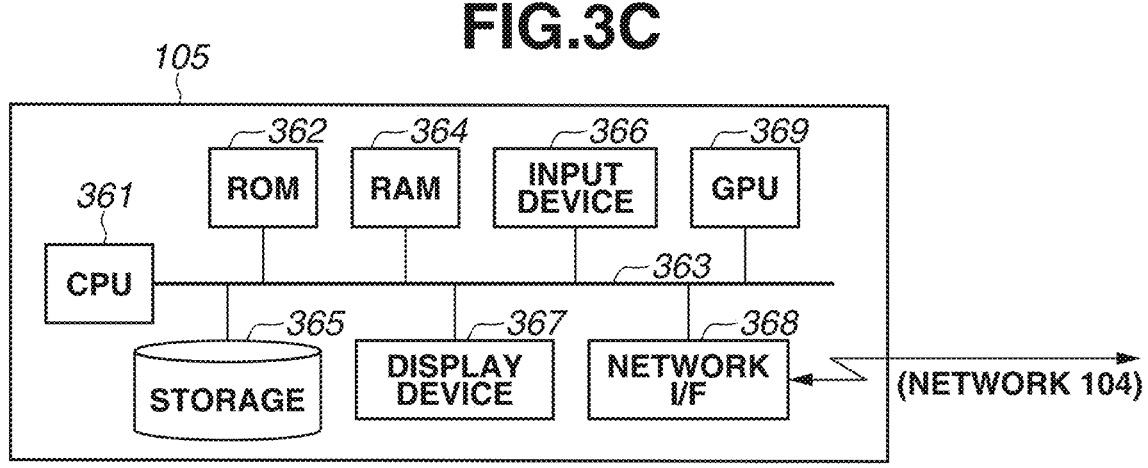
FIG. 3C illustrates the hardware configuration of a data server.

FIG. 3C illustrates a configuration of the data server 105.

The data server 105 includes a CPU 361, a ROM 362, a RAM 364, a storage 365, an input device 366, a display device 367, a network I/F 368, and a GPU 369. The foregoing components can transmit and receive data to and from one another via a system bus 363. The components are similar to those of the machine learning server 102, and redundant descriptions thereof will be omitted.

<Software Configuration of System>

Figure 4:
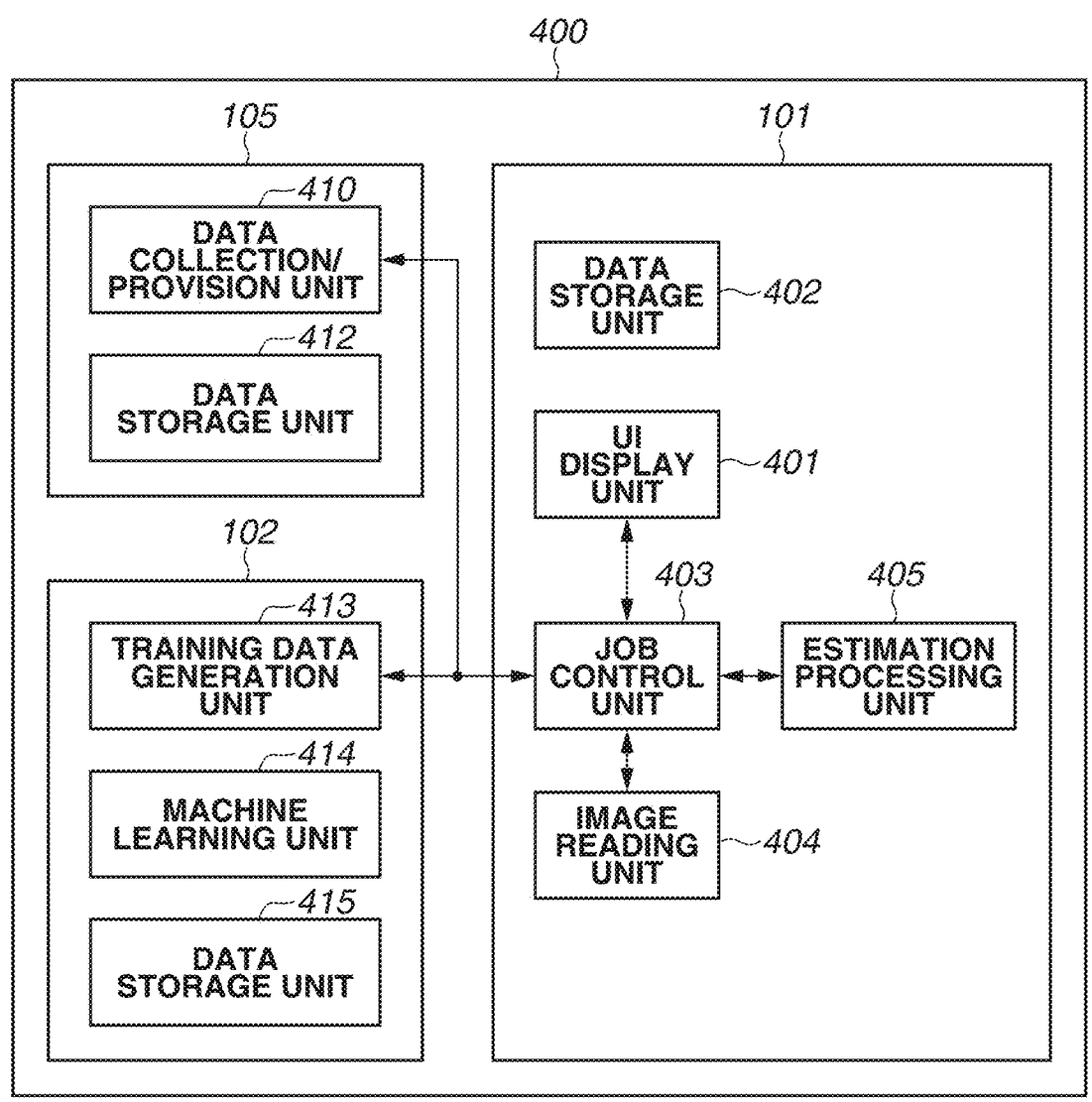
FIG. 4 illustrates the software configuration of a system.

FIG. 4 illustrates a software configuration (400) to work by using the hardware resources illustrated in the hardware configuration diagram in FIG. 2 and programs. The programs to work the software configuration are stored in components, and a program to be run by a CPU is loaded to the corresponding RAM. For example, in the image forming apparatus 101, a program to be run stored in the HDD 204 and read to the RAM 202 is run by the CPU 201. The same applies to the machine learning server 102 and the data server 105.

The software configuration illustrated in FIG. 4 offers a function of performing top/bottom error estimation processing using the training data read by the image forming apparatus 101 in the system. Functional roles of the components in FIG. 4 will be described.

The software of the image forming apparatus 101 includes a data storage unit 402, a job control unit 403, a user interface (UI) display unit 401, an image reading unit 404, and the estimation processing unit 405. The software of the machine learning server 102 includes a training data generation unit 413, the machine learning unit 414, and a data storage unit 415. The software of the data server 105 includes a data collection/provision unit 410 and a data storage unit 412.

The data storage unit 402 has a functional role of recording data, such as image data, training data, and training model, input and output by the image forming apparatus 101 between the RAM 202 and the HDD 204 of the hardware configuration illustrated in FIG. 2.

The job control unit 403 has a functional role of mainly carrying out basic functions, such as copy, facsimile, and print functions, of the image forming apparatus 101 based on instructions issued by the user, and of transmitting and receiving instructions and data between other software components in carrying out a basic function.

The UI display unit 401 has a functional role of receiving operation settings via the operation device I/F 206 illustrated in FIG. 2 made on a screen of the operation device 140 by the user and of providing the operation reception screen. The UI display unit 401 has a functional role of displaying a notification screen for notifying the user of a message such as an estimation result by the estimation processing unit 405 in the system.

The image reading unit 404 has a functional role of optically reading a document using the scanner 10 illustrated in FIG. 2 in carrying out a copy or scan function based on an instruction from the job control unit 403.

The estimation processing unit 405 is operated by the CPU 201 and the GPU 291 illustrated in FIG. 2 and has a functional role of performing estimation processing and classification processing on data input and output by the image forming apparatus 101 to carry out the AI function. The estimation processing is performed based on an instruction from the job control unit 403, the result output from the estimation processing unit 405 is transmitted to the job control unit 403, and the UI display unit 401 displays a notification message, whereby feedback is provided to the user.

The data collection/provision unit 410 has a functional role of collecting and providing training data for the machine learning server 102 to learn. In the system, the data collection/provision unit 410 has a functional role of receiving training data containing operation information about the image forming apparatus 101 from the image forming apparatus 101 and then of providing the training data to the machine learning server 102. Further, data may be collected from an image forming apparatus other than the image forming apparatus 101, the general-purpose computer 103, and another data server, and appropriate data for intended machine learning is collected. The data storage unit 412 has a functional role of recording and managing the collected training data.

The training data generation unit 413 has a functional role of optimizing the training data by processing the data received from the data server 105 into data suitable to produce an effective learning result by removing unnecessary data as noise. The training data generation unit 413 is operated by the CPU 301 illustrated in FIG. 3.

The data storage unit 415 temporarily stores data received from the data server 105, generated training data, and the trained model of the machine learning unit 414 in the RAM 304 or the storage 305 in FIG. 3.

The machine learning unit 414 performs machine learning using the training data generated by the training data generation unit 413 as input and using the GPU 309 and the CPU 301 as hardware resources in FIG. 3 and a learning method using the training model in FIG. 5.

<Training Model>

FIG. 5 is a conceptual diagram illustrating an input/output configuration using the training model of the machine learning unit 414 according to the first exemplary embodiment, and the training model using a neural network is illustrated as an example in FIG. 5. Further, training data X involved in generating the training model for predicting a top/bottom error based on scanned document information as input using the neural network is illustrated as an example to describe a feature of the system. The training data X comes in three types: a document containing an image only, a document containing text only, and a document containing both an image and text. Input data includes object orientation/composition and text.

Specific machine learning algorithms includes the nearest neighbor algorithm, the naïve Bayes method, decision tree, and support vector machines, in addition to a neural network. Further, another specific machine learning algorithm is deep learning to generate feature values and combined weighting factors for learning using a neural network. Machine learning algorithms usable among the above algorithms are applicable to the present exemplary embodiment as appropriate.

The training model may include an error detection unit and an updating unit. The error detection unit determines an error between teaching data T and output data Y(4) output from an output layer of the neural network based on input data X(2) input to an input layer. Then, the error detection unit calculates a loss (L) representing the error between the output data Y(4) from the neural network and the teaching data T using a loss function.

The updating unit updates the combined weighting factors between nodes in the neural network based on the loss (L) calculated by the error detection unit to reduce the loss (L). The updating unit updates the combined weighting factors using, for example, back propagation. The back propagation is a process of adjusting combined weighting factors between nodes in a neural network to reduce the error (L).

A training model (W) prepares a large amount of training data including sets of "input data with a known correct value" and "correct value". Then, weighting factors in the training model (W) are adjusted to bring an output value from input data corresponding to a correct value as close to the correct value as possible, producing the training model (W) with high accuracy. That is referred to as a learning process, and a training model adjusted through a learning process is referred to as a trained model. Teaching data prepared (a set of "input data with a known correct value" and "correct value") is as described below.

A. Teaching Data

Input data (X): object, composition, and text information about document data with the correct top and bottom.

Expected value (T): A (without top/bottom error)=1, B (with top/bottom error)=0.

The expected value (T) is a value of output (Y) representing "correct value" for "input data with a known correct value" as an input.

Y1 indicates a correct orientation, whereas Y2 indicates an incorrect orientation. Further, while the case where the top and bottom are inverted is described in the present exemplary embodiment, the present exemplary embodiment is obviously also applicable to a document rotated by 90 degrees.

The loss (L) is calculated based on a predetermined loss function with the output (Y) calculated from the input data (X) as teaching data and the expected value (T).

The loss function according to the present exemplary embodiment is as follows.

A. Teaching data.

Loss (L)=1–"estimation probability of A of output (Y)".

The weights between the layers of the training model (W) in the intermediate layer are adjusted to bring the loss (L) closer to zero.

The training model (W) adjusted as described above is employed as a trained model, and that model is loaded to the machine learning unit 414.

<Input Data, Teaching Data>

FIG. 7 illustrates an example of a configuration of the input data illustrated in FIG. 5. The input documents are roughly classified into three types: a document containing text only, a document containing an image only, and a document (c) containing both text and an image. According to the present exemplary embodiment, all the types of images are learned so that the top and bottom of any of the images can be determined using one training model.

Document No. 2 is an example of a document that contains text only and is inverted. Document No. 4 is an example of a document that contains an image only and is inverted. Document No. 6 is an example of a document that contains both text and an image and is inverted. Document No. 8 is similar to document No. 4. In order to enable discrimination between the top and bottom of an image containing an image only, roughly two types of images are input to perform learning. One of them is a type of an image containing a subject (object) such as a vehicle. Structural features and shadows of vehicles with tires on the underside are learned for one training model to enable discrimination between the top and bottom. The other is a type of an image containing no objects, such as a landscape. Images of that type are learned for one training model to enable discrimination of an image of that type based on the composition of the image.

FIG. 8 illustrates an example of teaching data.

The input (X) is "document data a" on a page, and the expected value (T) is "T1 (without top/bottom error)=1, T2 (with top/bottom error)=0". The training items are the object orientation, composition, and text. The foregoing teaching data is used as information corresponding to the input data to train the training model.

<Process by Machine Learning Server>

A procedure of processing by the machine learning unit 414 and the estimation processing unit 405 will be described with reference to a flowchart illustrated in FIG. 9. The CPU 301 loads a program stored in the ROM 302 or the storage 305 to the RAM 304 and runs the loaded program to perform the process.

The machine learning unit 414 periodically checks whether the training data is updated. At a timing when the machine learning unit 414 determines that the training data is updated, the machine learning unit 414 starts a learning phase. First, in step S901, the machine learning unit 414 receives training data. The training data is the above-described document data. Thereafter, in step S902, the machine learning unit 414 performs machine learning based on the received data. Thereafter, in step S903, the machine learning unit 414 determines whether the machine learning is ended. If the machine learning is not ended (NO in step S903), the machine learning unit 414 repeats the processing of step S902. Otherwise (YES in step S903), in step S904, the machine learning unit 414 notifies the estimation processing unit 405 that the trained model is updated. Thereafter, in step S905, the machine learning unit 414 determines whether a trained model transmission request is received. If a trained model transmission request is not received (NO in step S905), the machine learning unit 414 repeats the processing of step S905 and waits for a transmission request from the estimation processing unit 405. Otherwise (YES in step S905), in step S906, the machine learning unit 414 transmits the trained model to the estimation processing unit 405.

<Process by Image Forming Apparatus>

Figure 11A:
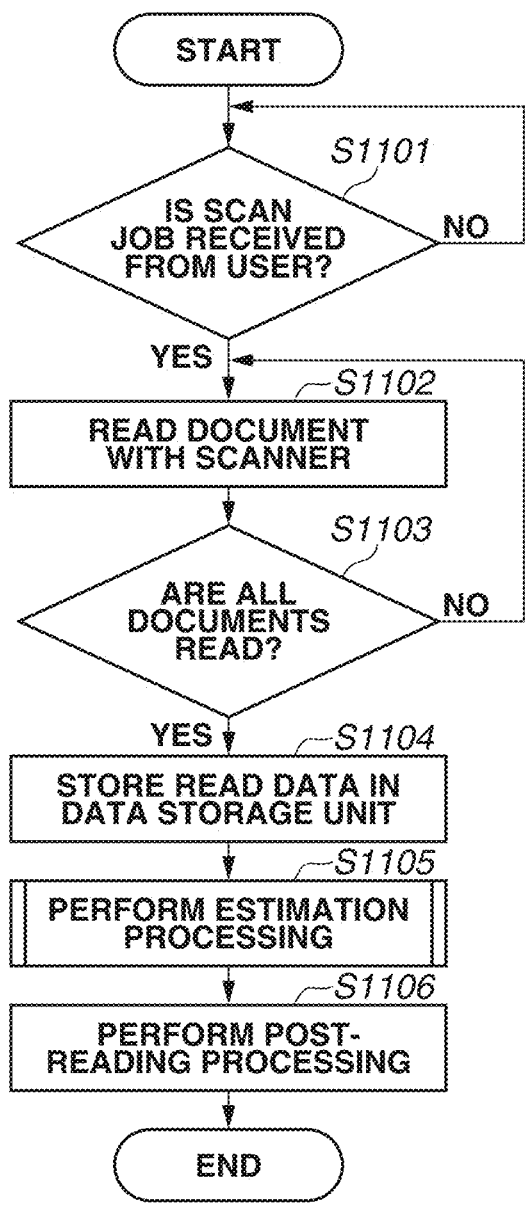
FIG. 11A is a flowchart illustrating a reading process.
Figure 11B:
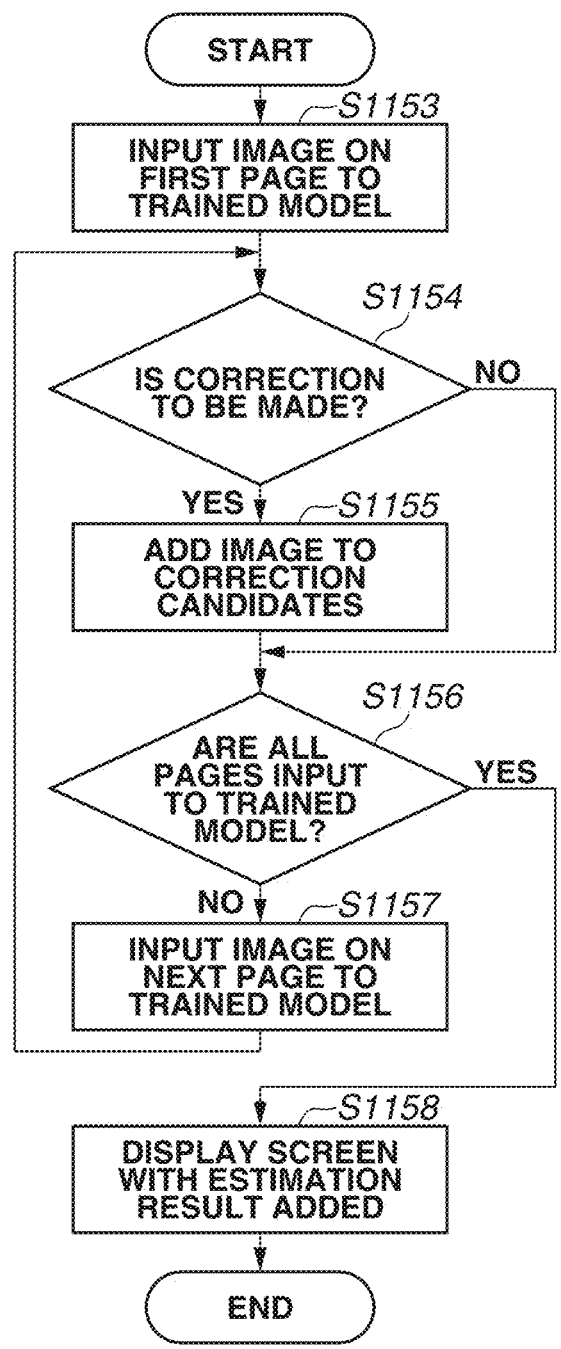
FIG. 11B is a flowchart illustrating an estimation process.

FIG. 11A is a flowchart illustrating a reading process. FIG. 11B is a flowchart illustrating an estimation process.

The process of a scan job will be described with reference to the flowcharts in FIGS. 11A and 11B. The CPU 201 loads a program stored in the ROM 203 or the HDD 204 to the RAM 202 and runs the loaded program to perform the process.

In step S1101, the job control unit 403 determines whether an instruction to start a scan job is received from the user by the operation device 140. If the instruction is not received (NO in step S1101), the job control unit 403 waits until the instruction is received. Otherwise (YES in step S1101), the processing proceeds to step S1102. In step S1102, the scanner 10 reads a document placed on an auto-document feeder (ADF) or a platen glass. In step S1103, the job control unit 403 determines whether all the documents are read by the scanner 10. If not all the documents are read (NO in step S1103), the processing is repeated until all the documents are read. After all the documents are read (YES in step S1103), in step S1104, the job control unit 403 stores the read data in the data storage unit 402. After the read data is temporarily stored, in step S1105, the CPU 201 performs estimation processing to determine whether there is an error in page order. Details of the estimation processing will be described below. After the estimation processing ends, in step S1106, post-reading processing (printing, data storage, data transmission) is performed, and the process ends.

Details of the estimation processing in step S1105 will be described.

In step S1153, starting with the first page, the estimation processing unit 405 sequentially inputs the images read in step S1102 to the trained model. The estimation processing unit 405 acquires information (output result) indicating whether the top and bottom of the document is incorrect from the trained model. If the top and bottom are incorrect, i.e., if a correction is to be made (YES in step S1154), in step S155, the estimation processing unit 405 adds the target image to correction candidates. Otherwise, i.e., if a correction is not to be made (NO in step S1154), step S1155 is skipped. Thereafter, in step S1156, the estimation processing unit 405 checks whether all the pages are input to the trained model. If there is a page that is not input (NO in step S1156), the processing proceeds to step S1157. In step S1157, the estimation processing unit 405 inputs the next image subsequent to the processed page to the trained model, and the processing proceeds to step S1154. On the other hand, if all the pages are input (YES in step S1156), the processing proceeds to step S1158. In step S1158, the estimation processing unit 405 displays an operation screen with the estimation result added on the operation device 140.

<Screen after Estimation>

Figure 10C:
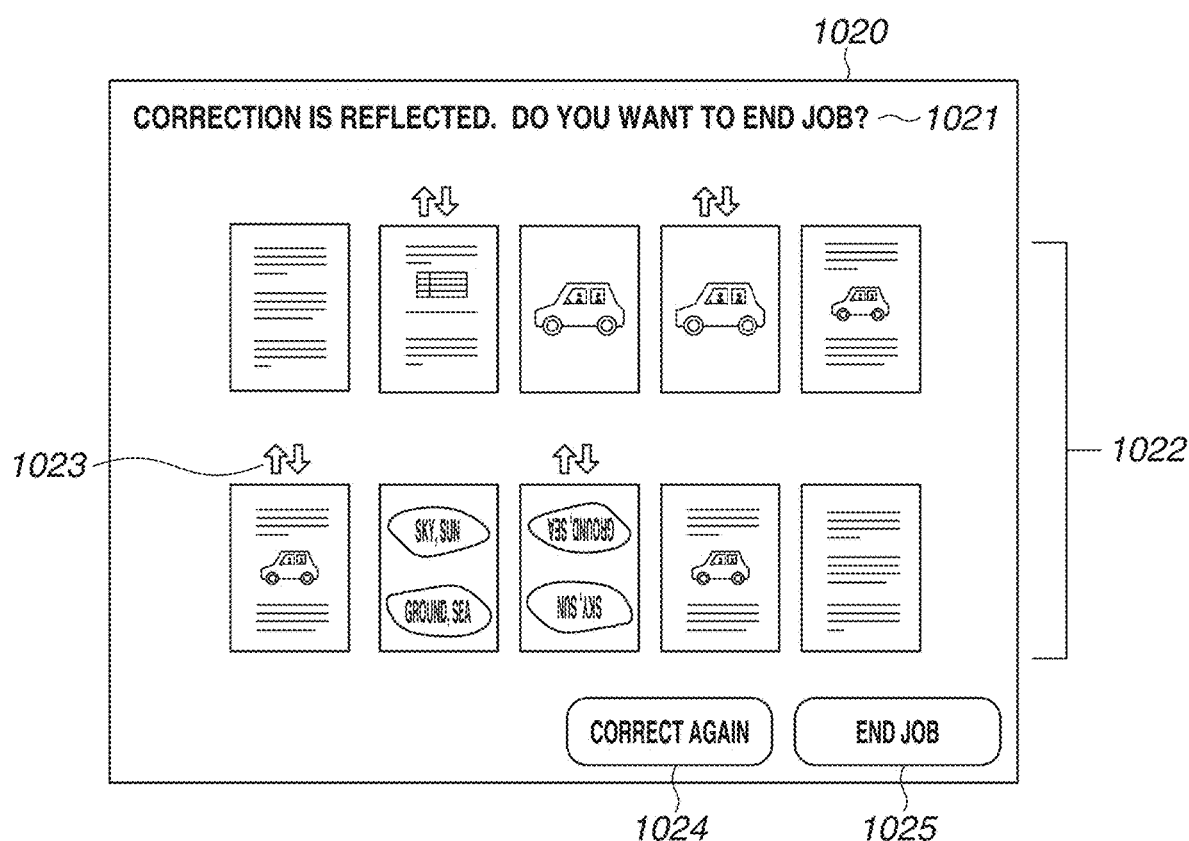
FIG. 10C illustrates a read image list screen.

FIG. 10A illustrates a read image list screen. FIG. 10B illustrates a screen presenting a suggested correction for a read image. FIG. 10C illustrates a read image list screen.

In step S1158, for example, the screen as illustrated in FIG. 10A is displayed on the operation device 140.

A screen 1000 is a read image list screen. The screen 1000 includes information 1001, a list 1002, an icon 1003, a selection frame 1004, and buttons 1005, 1006, and 1007.

The list 1002 is information about a list of images read in the reading process. While the thumbnail images of a plurality of pages are displayed in a list according to the present exemplary embodiment, the plurality of pages can be displayed in a list form. According to the present exemplary embodiment, each image designated as a correction candidate in the estimation process is given the icon 1003. The icon 1003 is an icon that indicates a top/bottom correction candidate. Further, according to the present exemplary embodiment, the correction candidates are changed to a selected state in advance in displaying the list 1002. The message of the information 1001 notifies the user that the correction candidates are in the selected state. The selection frame 1004 is superimposed and displayed on each image in the selected state. Each image is switched between a selected state and a non-selected state each time a selecting operation is performed.

The button 1005 is a selection object for correcting all the images in the selected state together to the suggested corrections produced in the estimation process. If the button 1005 is selected with the correction candidate images in the selected state, the screen is changed to the screen illustrated in FIG. 10C.

The button 1006 is a selection object for changing to a screen for checking a suggested correction for an image in the selected state. If the button 1006 is selected with a correction candidate in the selected state, the screen is changed to the screen for checking the suggested correction for the correction candidate.

The button 1007 is a selection object for continuing the process without correction. If the button 1007 is selected, the screen is changed to a screen (not illustrated) for completing the job.

A screen 1010 is a screen for checking a suggested correction. In FIG. 10B, an example of a screen for checking a suggested correction for the second image of the correction candidates. With the correction candidates selected, the button 1006 is selected, and after a suggested correction for the first image of the correction candidates is checked, the screen 1010 is displayed.

The screen 1010 includes information 1011, information 1012, information 1013, and buttons 1014, 1015, and 1016.

The information 1011 is a message that prompts the user to correct a document orientation.

The information 1012 is an information region where a suggested correction is presented. In the information 1012, the image rotated based on a trained model output result is arranged as a suggested correction.

The information 1013 is information that indicates the progress of the operation of checking the correction candidates. In the example illustrated in FIG. 10B, the information 1013 indicates that the second one of the four correction candidates is being checked.

The button 1014 is a selection object for determining to apply a suggested correction presented in the information 1012 to the correction candidate. If the button 1014 is selected, the screen is changed to a screen for checking the suggested correction for the third correction candidate image. Similarly, the suggested corrections for the third and fourth correction candidate images are checked, and thereafter the screen is changed to a screen illustrated in FIG. 10C.

The button 1015 is a selection object for determining to correct a correction candidate by a method different from the suggested correction presented in the information 1012. As a result that the button 1015 is selected, an edit screen (not illustrated) for editing to rotate the image is displayed.

The button 1016 is a selection object for determining not to correct a correction candidate for which the suggested correction is presented.

A screen 1020 is a screen that displays a list of read images reflecting the corrections. The screen 1020 includes information 1021, a list 1022, an icon 1023, and buttons 1024 and 1025.

The information 1021 is a message for checking whether the user wishes to end the correction and end the job.

The list 1022 is a list of images after the correction processing. According to the present exemplary embodiment, each corrected image is given the icon 1023.

The icon 1023 is an icon indicating that the top and bottom are corrected.

The button 1024 is a selection object for performing correction again. If the button 1024 is selected, processing is performed to return to the state of the screen 1000.

The button 1025 is a selection object for ending the job. If the button 1025 is selected, the job is run with the corrections in the drawings reflected. For example, if the job is an image storing job, the corrected image is stored. If the job is an image transmitting job, the corrected image is transmitted. If the job is an image printing job, the corrected image is printed.

<Remarks>

As described above, the system according to the present exemplary embodiment presents information about a read image estimated as being oriented incorrectly, if any, to the user. Further, the user can correct the image with ease by checking a presented suggested correction. Then, the corrected image can be used in various purposes such as printing, storing, and transmitting. Further, the icon 1003 given to each image estimated as having an orientation error and the icon 1023 to each corrected image provides an easy identification in the list to the user.

A second exemplary embodiment will be described below. In the example described above in the first exemplary embodiment, the top/bottom estimation is performed on a text document and an image document using one trained model, and correction candidates are presented together. In the second exemplary embodiment, an example will be described below in which each document is classified by type and undergoes estimation by the document type and thereafter processing by the document type. Each system configuration is similar to that in the first exemplary embodiment except for the configurations that relate to the above-described point. Thus, like numbers refer to like elements, and redundant descriptions of details thereof will be omitted.

<Estimation Accuracy>

FIGS. 12A to 12D illustrate examples of landscape images.

It is found that in estimating the top and bottom of a document, the top/bottom estimation accuracy varies depending on the type of the document. For example, the estimation accuracy for a document that contains text is often high, whereas the estimation accuracy for a document that does not contain text is often low. The estimation accuracy for especially a document that contains an image only, such as a landscape picture, among the documents that do not contain text, is low.

Figure 12A:
FIGS. 12A to 12D illustrate examples of landscape images.
Figure 12B:
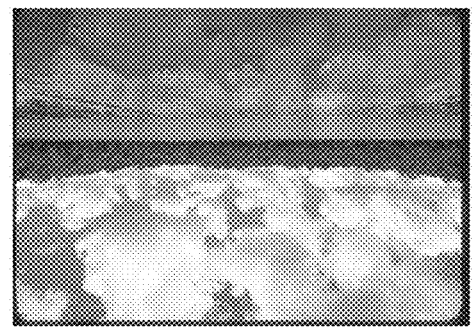
Figure 12C:
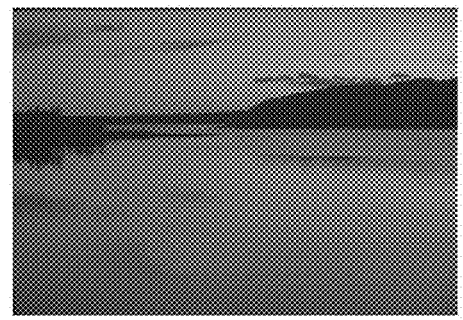
Figure 12D:

FIG. 12A illustrates an example of a landscape image, and FIG. 12B illustrates a mirror image of the landscape image. FIG. 12C illustrates an example of a landscape image, and FIG. 12D illustrates a mirror image of the landscape image.

A landscape picture in a composition with light reflecting on a water surface as in FIGS. 12A and 12C has little information for discriminating between the top and the bottom, which is more likely to lead to low estimation accuracy. By performing learning to estimate a portion that is high in saturation, brightness, and/or hue as a top portion, the top and bottom can be estimated for FIGS. 12A and 12B, but it is still difficult to estimate the top and bottom for FIGS. 12C and 12D.

<Settings for Each Type>

Figure 13A:
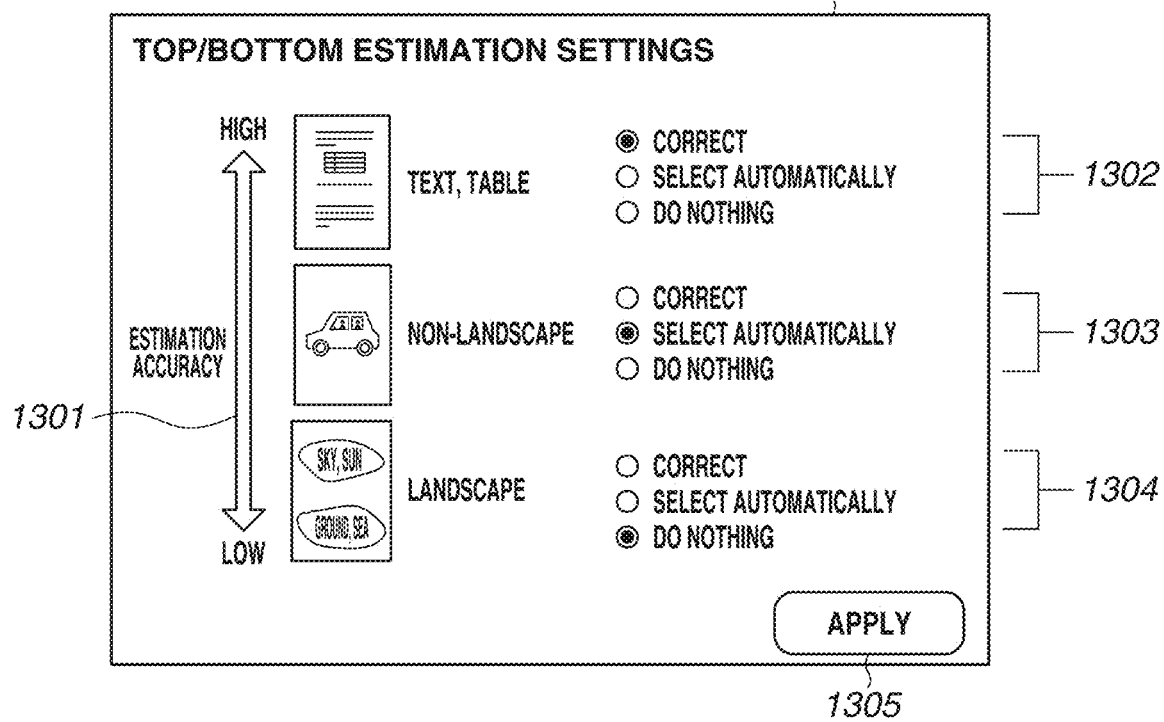
FIG. 13A illustrates a top/bottom estimation setting screen.

FIG. 13A illustrates a top/bottom estimation setting screen.

A screen 1300 is a top/bottom estimation setting screen. The screen 1300 includes information 1301, setting regions 1302, 1303, and 1304, and a button 1305.

The information 1301 is information indicating a rough standard for the estimation accuracy. On the basis of the information 1301, the estimation accuracy for text/table documents is the highest, the estimation accuracy for non-landscape documents is the second highest, and the estimation accuracy for landscape documents is the lowest. The user determines the post-estimation process based on the information 1301.

The setting regions 1302, 1303, and 1304 are regions where the process after top/bottom estimation is set for each document type. Setting items come in three types: "correct", "select automatically", and "do nothing". In FIG. 13A, "correct", "select automatically", and "do nothing" are set in the setting regions 1302, 1303, and 1304, respectively.

Figure 13B:
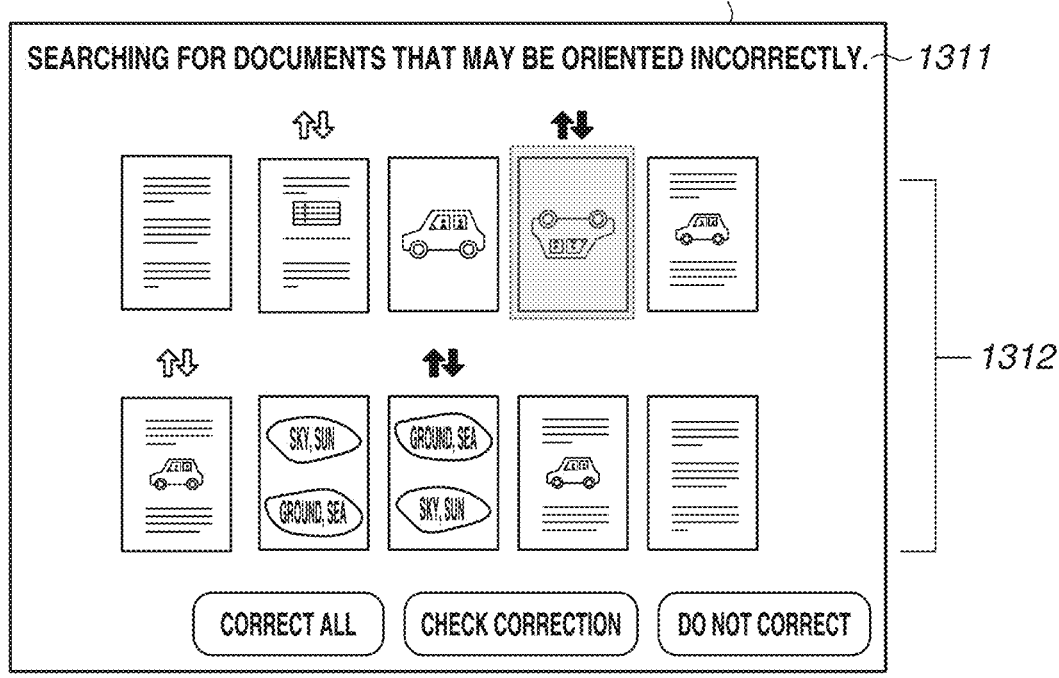
FIG. 13B illustrates a read image list screen.

Through the top/bottom estimation process with the settings illustrated in FIG. 13A, a screen as illustrated in FIG. 13B is displayed.

A screen 1310 is a read image list screen. The screen 1310 includes information 1311 and a list 1312.

The list 1312 is a list of images read in the reading process. An image that is determined as a correction candidate in the estimation process and that is a target of the processing "correct" is given the icon 1023. An image that is determined as a correction candidate in the estimation process and that is not a target of the processing "correct" is given the icon 1003. Further, according to the present exemplary embodiment, in displaying the list 1312, an image that is a correction candidate and that is a target of the processing "select automatically" is automatically selected, and the selection frame 1004 is superimposed and displayed on the image. Specifically, a change of the settings on the screen 1300 offers different processing states of the correction candidates in displaying the screen 1310.

<Process by Image Forming Apparatus>

Figure 14:
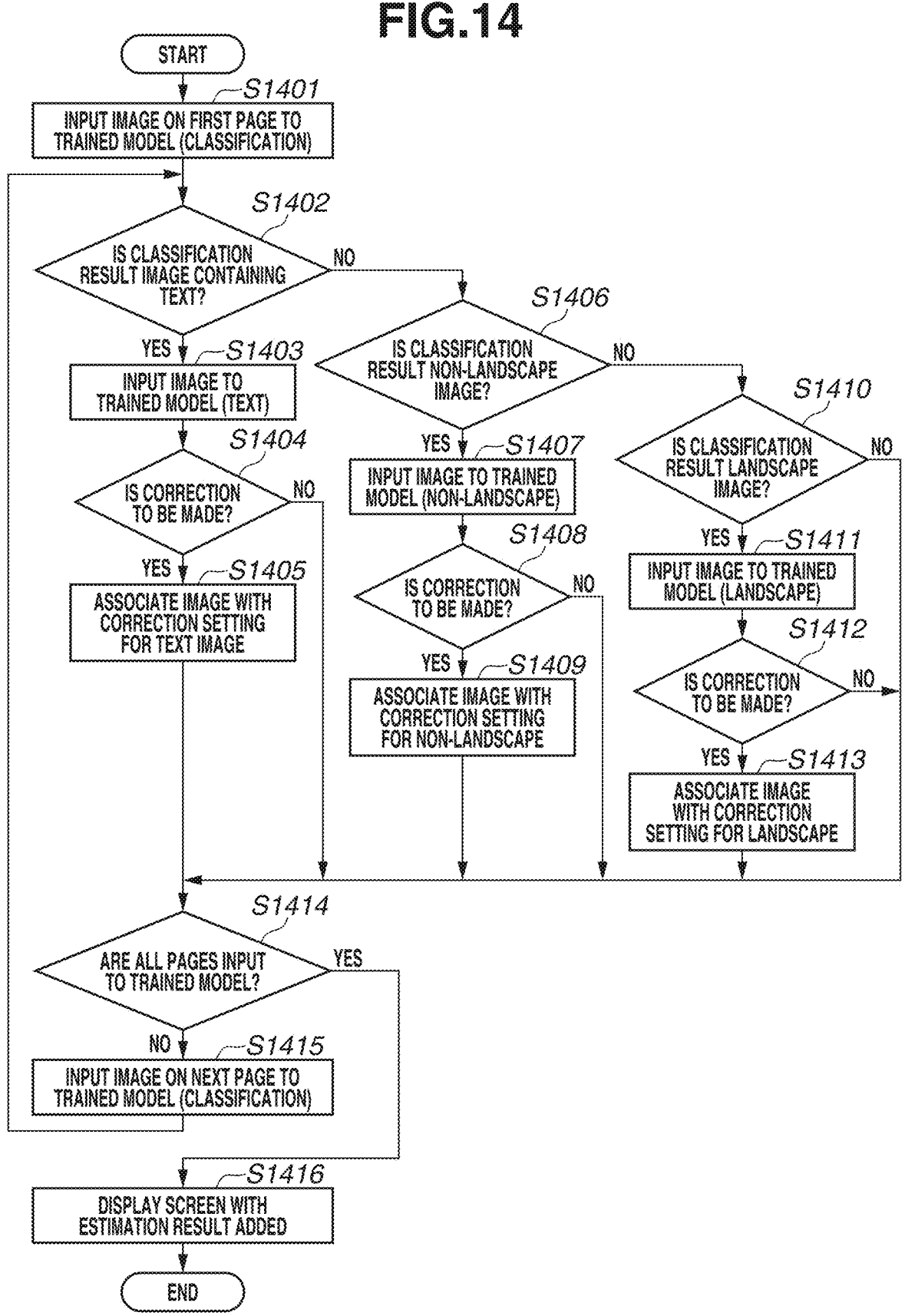
FIG. 14 is a flowchart illustrating an estimation process.

FIG. 14 is a flowchart illustrating an estimation process.

In step S1105, the estimation process is performed as described below according to the second exemplary embodiment.

In step S1401, starting with the first page, the estimation processing unit 405 sequentially inputs the images read in step S1102 to the trained model (classification). The trained model (classification) is a trained model that is trained using various input images, similarly to the training model illustrated in FIG. 5, and is also trained to enable image type classification. Thus, label information about image types such as "text", "non-landscape", "landscape", and "other" is used as teaching data, which is a difference from that of the first exemplary embodiment.

The estimation processing unit 405 acquires the label information corresponding to the image from the trained model (classification).

If the label information "text" is obtained as the result of inputting the image (YES in step S1402), in step S1403, the estimation processing unit 405 further inputs the read image to a trained model (text). The trained model (text) is a trained model that is trained based on various images containing text and orientation information. If the result indicating a top/bottom error is obtained from the trained model (text) (YES in step S1404), in step S1405, the estimation processing unit 405 associates the read image with the processing setting for text images that is set on the screen 1300. On the other hand, if the result indicating that the top and bottom are correct is obtained (NO in step S1404), the processing proceeds to step S1414.

If the label information "non-landscape" is obtained as the result of inputting the read image (NO in step S1402, YES in step S1406), in step S1407, the estimation processing unit 405 further inputs the read image to a trained model (non-landscape). The trained model (non-landscape) is a trained model that is trained based on various non-landscape images and orientation information. If the result indicating a top/bottom error is obtained from the trained model (non-landscape) (YES in step S1408), in step S1409, the estimation processing unit 405 associates the read image with the processing setting for non-landscape images that is set on the screen 1300. On the other hand, if the result indicating that the top and bottom are correct is obtained (NO in step S1408), the processing proceeds to step S1414.

If the label information "landscape" is obtained as the result of inputting the read image (NO in step S1402, NO in step S1406, YES in step S1410), in step S1411, the estimation processing unit 405 further inputs the read image to a trained model (landscape). The trained model (landscape) is a trained model that is trained based on various landscape images and orientation information.

If the result indicating a top/bottom error is obtained from the trained model (landscape) (YES in step S1412), in step S1413, the estimation processing unit 405 associates the read image with the processing setting for landscape images that is set on the screen 1300. On the other hand, if the result indicating that the top and bottom are correct is obtained (NO in step S1412), the processing proceeds to step S1414.

If the label information "other" is obtained as the result of inputting the image (NO in step S1402, NO in step S1406, NO in step S1410, NO in step S1410), the processing proceeds to step S1414.

Then, in step S1414, the estimation processing unit 405 checks whether all the pages are input to the trained model.

If not all the pages are input (NO in step S1414), the processing proceeds to step S1415. In step S1415, the estimation processing unit 405 inputs the next read image subsequent to the processed page to the trained model (classification), and the processing returns to step S1402. On the other hand, if all the pages are input (YES in step S1414), the processing proceeds to step S1416.

In step S1416, the estimation processing unit 405 displays an operation screen with the estimation result added on the operation device 140.

As described above, the system according to the present exemplary embodiment presents a read image estimated as being oriented incorrectly, if any, to the user. Especially, the system classifies documents by type, and performs top/bottom estimation using different training models each suitable for the document type, which is more likely to provide an improved estimation accuracy. Further, the system allows the post-estimation process to be set for each document type, providing an easy handling based on the estimation accuracy.

(Other Exemplary Embodiments)

The present disclosure is not limited to the above-described exemplary embodiments, and various modifications (including organic combinations of the exemplary embodiments) can be made based on the spirit of the present disclosure and are not intended to be excluded from the scope of the present disclosure. Specifically, combinations of the above-described exemplary embodiments and modified examples thereof are all encompassed within the scope of the present disclosure.

While the examples where the screens are displayed on the operation device 140 are described in the first and second exemplary embodiments, the information display destination is not limited to the operation device 140. For example, a similar screen can be displayed on a mobile terminal or a personal computer (PC) using Virtual Network Computing (VNC). Further, a webpage that is accessible from a web browser on a mobile terminal or a PC can be provided to display equivalent-content information on the mobile terminal or the PC.

While the three classifications "text", "non-landscape", and "landscape" are described as a method of classifying an image read from a document in the second exemplary embodiment, a different classification method, the different number of classifications, and a different combination can be employed. For example, a method of simply classifying into "text" and "image" can be employed. In this case, an optical character recognition (OCR) result that contains text is classified into "text", whereas an OCR result that does not contain text is classified into "image".

While the trained model (text) is used in the second exemplary embodiment, a known OCR technique can be employed to determine an image orientation from which text is detected most frequently by OCR as a correct orientation.

While the three apparatuses that are the image forming apparatus 101, the machine learning server 102, and the data server 105 share the roles of the software configuration 400 according to the above-described exemplary embodiments, a single apparatus can have the roles of the software configuration 400, or the number of apparatuses that share the roles of the software configuration 400 can be any number other than three.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s)

and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-202982, filed Dec. 7, 2020, which is hereby incorporated by reference herein in its entirety.

What is claimed is:

1. An image processing apparatus comprising:
a display device configured to display information;
a scanner configured to scan a document to generate document data; and
one or more controllers configured to function as:
an input unit configured to input the generated document data to a trained model, the trained model configured to classify whether the generated document data is at least one of an image containing text, a landscape image or a non-landscape image,
the input unit being further configured to input the generated document data to a further trained model, the further trained model is selected based on whether the trained model classifies the generated document data as the image containing text, the landscape image or the non-landscape image, wherein the further trained model determines if an orientation of the generated document data is correct; and
a display control unit configured to cause the display device to display prior to correction, a correction candidate for correcting the orientation of the generated document data based on at least an output result from the further trained model.

2. The image processing apparatus according to claim 1, wherein the display control unit causes the display to device to display the document data rotated based on the output result on the display device.

3. The image processing apparatus according to claim 2, wherein the document data rotated based on the output result is an image presenting a suggested correction.

4. The image processing apparatus according to claim 1, wherein the display control unit causes the display device to display the document data rotated based on the output result and the document data before being rotated next to each other.

5. The image processing apparatus according to claim 1, wherein on a screen displaying image list information about the generated document data, the display control unit causes the display device to display the information about document data in a selected state based on the output result.

6. The image processing apparatus according to claim 1, wherein on a screen displaying image list information about the generated document data, the one or more controllers arrange document data in a rotated orientation based on the output result.

7. The image processing apparatus according to claim 1, wherein on a screen displaying image list information about the generated document data, the one or more controllers associate document data with a predetermined icon based on the output result.

8. The image processing apparatus according to claim 7, wherein the predetermined icon is an icon that identifies document data having an image orientation error.

9. The image processing apparatus according to claim 7, wherein the predetermined icon is an icon that identifies document data having an orientation rotated based on the output result.

10. The image processing apparatus according to claim 1, wherein on a screen displaying image list information about the generated document data, the one or more controllers correct all document data each having an image orientation error together.

11. The image processing apparatus according to claim 1, wherein the one or more controllers preset a process to be performed on an image having an image orientation error for each image type.

12. The image processing apparatus according to claim 1, wherein the generated document data is document data generated as a target to be stored.

13. The image processing apparatus according to claim 1, wherein the generated document data is document data generated as a target to be transmitted externally.

14. The image processing apparatus according to claim 1, wherein the generated document data is document data generated as a target to be printed.

15. The image processing apparatus according to claim 1, further comprising a printer configured to print an image on a sheet.

16. A method of controlling an image processing apparatus including a display device configured to display information and a scanner configured to scan a document to generate document data, the method comprising:
inputting the generated document data to a trained model, the trained model configured to classify whether the generated document data is at least one of an image containing text, a landscape image or a non-landscape image;
inputting the generated document data to a further trained model, the further trained model is selected based on whether the trained model classifies the generated document data as the image containing text, the landscape image or the non-landscape image, wherein the further trained model determines if an orientation of the generated document data is correct; and
displaying, prior to correction, a correction candidate for correcting the orientation of the generated document data on the display device based on at least an output result from the further trained model.

17. A non-transitory computer-readable storage medium storing a computer-executable program for executing a method of controlling an image processing apparatus including a display device configured to display information and a scanner configured to scan a document to generate document data, the method comprising:

- inputting the generated document data to a trained model, the trained model configured to classify whether the generated document data is at least one of an image containing text, a landscape image or a non-landscape image;
- inputting the generated document data to a further trained model, the further trained model is selected based on whether the trained model classifies the generated document data as the image containing text, the landscape image or the non-landscape image, wherein the further trained model determines if an orientation of the generated document data is correct; and
- displaying, prior to correction, a correction candidate for correcting the orientation of the generated document data on the display device based on at least an output result from the further trained model.

\* \* \* \* \*